(No Model.)

R. J. AULTMAN.
CORN HARVESTER.

No. 476,595. Patented June 7, 1892.

Witnesses.
Robert Emett,
J. A. Rutherford.

Inventor:
Riley J. Aultman.
By Fred W. Bond
Atty.

UNITED STATES PATENT OFFICE.

RILEY J. AULTMAN, OF SHANESVILLE, OHIO.

CORN-HARVESTER.

SPECIFICATION forming part of Letters Patent No. 476,595, dated June 7, 1892.

Application filed February 17, 1892. Serial No. 421,819. (No model.)

*To all whom it may concern:*

Be it known that I, RILEY J. AULTMAN, a citizen of the United States, residing at Shanesville, in the county of Tuscarawas and State of Ohio, have invented certain new and useful Improvements in Corn-Harvesters; and I do hereby declare that the following is a full, clear, and exact description of the same, reference being had to the annexed drawings, making a part of this specification, and to the letters of reference marked thereon, in which—

Figure 1:
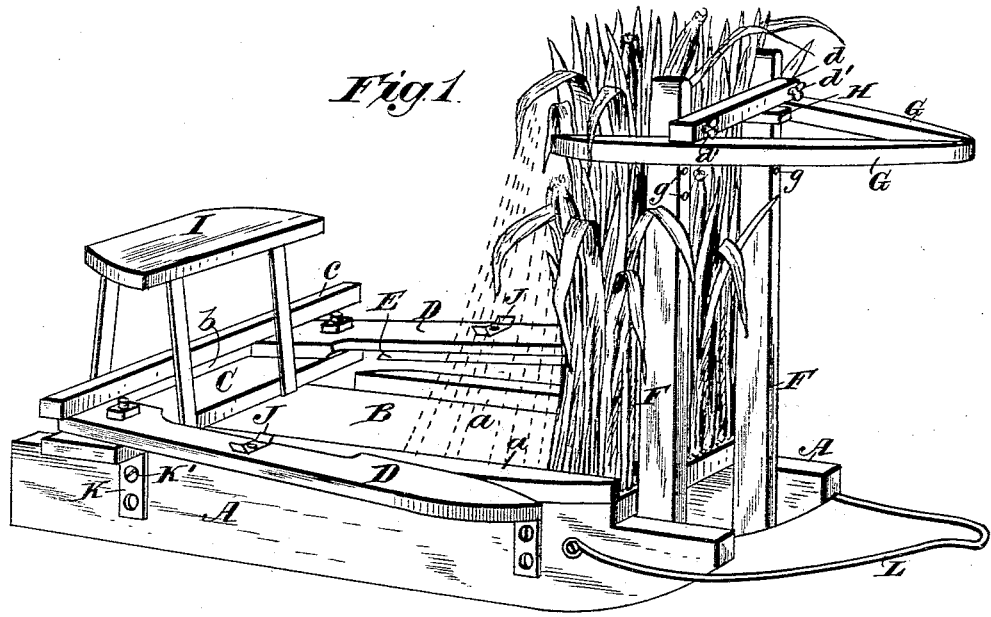
Figure 2:
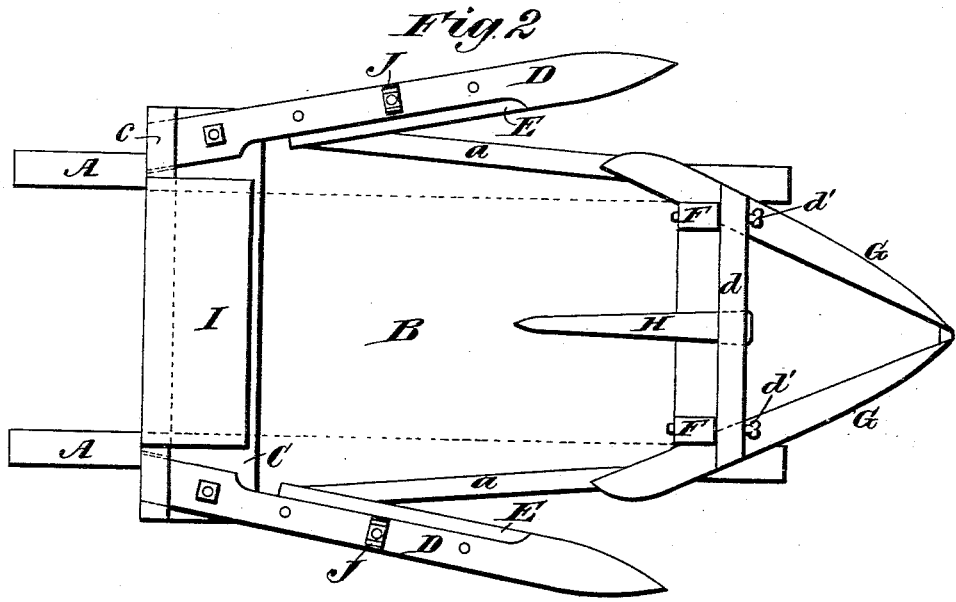
Figure 3:

Figure 1 is a perspective view showing the harvester in an operative position. Fig. 2 is a top view showing the location of the knives and their bars when placed in proper position to cut. Fig. 3 is a transverse section of one of the knife-bars, showing the location of the knife.

The present invention has relation to corn-harvesters; and it consists in the different parts and combination of parts hereinafter described, and particularly pointed out in the claims.

Similar letters of reference indicate corresponding parts in all the figures of the drawings.

In the accompanying drawings, A represents the runners, which may be substantially of the form shown and are held at the desired distance apart by means of the platform or floor B, which is adjustably attached to the runners A. To the sides of the platform B are attached in any convenient or well-known manner the ribs $a$, which ribs are located substantially as shown in the drawings. To the rear end of the platform or floor B is attached the cross-bar C, which cross-bar extends a short distance beyond the outer edges of the runners A, substantially as illustrated in the drawings. To the top or upper side of the cross-bar C is attached the bar $b$, and to the top of the bar $b$ is attached the bar $c$, which bar extends past and beyond the bar $b$ for the purpose hereinafter described. The rear ends of the knife-bars D are pivotally attached to the cross-bar $c$ or its equivalent. Said knife-bars extend a short distance back of their pivotal points for the purpose of providing suitable stops for said knife-bars. To the knife-bars D are securely attached the cutting-knives E, which cutting-knives are inclined upward for the purpose of producing a shearing cut. To the front or forward end of the runners A are attached the posts or standards F, which are located substantially as shown in Fig. 1, and to the top or upper ends of the posts or standards F is attached the cross-bar $d$, which cross-bar is adjustably attached to said posts or standards by means of the clamping-bolts $d'$ or their equivalents. To the end of the cross-bar $d$ are attached the spreading and retaining bars G, which spreading-bars extend forward and rearward, their front or forward ends converging and their rearward portions diverging, substantially as illustrated in Figs. 1 and 2, and are so arranged for the purpose hereinafter described.

In use the device is preferably pulled between two rows of corn, and when in proper position the cutting-knives, together with the knife-bars D, stand at an angle to the runners A and to the platform B, thereby forming an opening between the cutting-edges of said knives and the runners A, the ribs $a$, and the platform B. It will be understood that as the stalks of corn are received between the runners A and the cutting-knives E the said knives will be brought into contact with the cornstalks, which will bring the stalks at an angle, and the tops of the stalks will pass the bars G and spring inward behind the bar D and between the bars G, which will form a support for the tops of the cornstalks, and as the harvester proper moves forward the knives E will cut or sever the cornstalks, after which the bottom or lower ends of the severed stalks are placed upon the platform B; and for the purpose of preventing the severed stalks from becoming disengaged from between the bars G their bottom or lower ends should be set at an angle, as illustrated in the dotted lines of Fig. 1. As the harvester proper is pulled forward, the forward ends of the bars G will enter between the rows of standing corn, thereby pressing or forcing the stalks outward until they pass said bars, at which time they will have a tendency to spring inward and be held at their top or upper ends. For the purpose of dividing the two rows of corn, the bar H is provided, which is attached in any convenient and well-known manner to the cross-bar $d$ or its equivalent and extends rearward, substantially as illustrated in Fig. 2.

To the rear part of the harvester proper is attached, in any convenient and well-known manner, the seat I, which seat is preferably formed of sufficient size for two persons to occupy, each person attending his respective row of corn as it is being cut.

For the purpose of regulating the knife-bars D, together with the cutting-knives E, the foot-plates J are provided, which foot-plates are attached to the top or upper sides of the knife-bars D, and are so located that they can be easily reached by the feet of the person occupying the seat I.

In use, when it is desired to pass a hill of corn without cutting, the knife-bars D, together with their knives, are brought inward until they go over or pass the ribs $a$. It will also be understood that said knife-bars may be brought inward for the purpose of passing an obstruction.

In use the harvester proper is moved or pulled between two rows of corn until any desired number of hills or stalks of corn have been cut and placed upon the platform, as above described, after which the stalks so placed may be removed from the platform and formed into a shock.

For the purpose of adjusting the platform or floor B to or from the ground, together with the knife-bars D and their knives E, said platform is adjustably attached to the runners A by means of the arms K, the top or upper ends of said arms being securely attached to the platform or floor B in any convenient or well-known manner. A very convenient way for attaching said arms would be to bend a portion of said arms at right angles and attach the said right-angled portion to the floor or platform.

For the purpose of providing a means of adjustment the arms K are provided with a series of apertures and the clamping-bolt K', placed in the desired aperture to give the desired adjustment.

The object and purpose of adjustably attaching the platform to the runners A is to provide a means to regulate the cutting height of the knives. The knife-bars D, together with their knives E, are placed on the top or upper side of the cross-bar C or its equivalent. One object of so placing the bars D is to bring said bars and their cutting-knives a short distance above the platform B B, thereby providing a better means for grass and weeds to pass under the bar C.

In use the "tie-hills" or "gallows" are made or formed at suitable distances apart, preferably formed ten to twelve hills apart. The operators then take their positions on the seat, the one on the right with his right foot on the foot-plate, the other foot on the platform B. The operator on the left places his left foot on the foot-plate J, with the right foot on the platform. The horse then moves the harvester proper between the two rows of standing corn, one of which is one of the rows that the tie-hills or gallows-stalks stand in, and as the harvester proper passes the tie-hills the cornstalks which have been placed upon the platform are removed and properly set up against the tie-hills or gallows. It will be understood that when a tie-hill or other point is reached where it is desired to remove the stalks from the platform B the operators dismount, each taking the cornstalks that are placed on his respective side of the arm H and setting them up against the tie-hill or shock. For the purpose of gathering the cornstalks between the knives E and the ribs $a$, the bars D extend some distance past or beyond the front or forward ends of said knives, as illustrated in Fig. 2. Said portions extending past the forward ends of the knives E act as gatherers and bring in proper position for cutting any straggling or leaning cornstalks. For the purpose of preventing the cornstalks from entering between the bars G the front or forward ends of said bars should be united together in any convenient and well-known manner.

In the drawings I have illustrated a yoke, as L, which yoke is for the purpose of attaching a whiffletree or its equivalent.

If desired, the runners A may be dispensed with and the platform B, together with its different attachments, mounted upon wheels.

Having fully described my invention, what I claim as new, and desire to secure by Letters Patent, is—

1. In a corn-harvester, the combination of the runners A, the platform or floor B, the posts or standards F, the spreading and retaining arms G, the bar $d$, and the pivoted knife-bars D, provided with the cutting-knives E, substantially as and for the purpose specified.

2. The combination of the runners A, the platform or floor B, the posts or standards F, the adjustable arms G, the arm H, and the pivoted arms D, provided with the cutting-knives E, substantially as and for the purpose specified.

3. The combination of the runners A, the platform or floor B, the adjustable arms K, and the pivoted knife-bars D, provided with the foot-plates J, substantially as and for the purpose specified.

4. The combination of the adjustable platform A, the pivoted knife-bars D, extending forward and beyond the knives E, the knives E, fixed to the bars D, the posts or standards F, the adjustable arms G, and the bar $d$, substantially as and for the purpose specified.

In testimony that I claim the above I have hereunto subscribed my name in the presence of two witnesses.

RILEY J. AULTMAN.

Witnesses:
H. J. BERGER,
JNO. F. MILLER.